Aug. 25, 1931.   C. R. GREEN   1,820,064
MEANS FOR ATTACHING UPHOLSTERY
Filed Jan. 9, 1926

INVENTOR
CHARLES R. GREEN
BY ATTORNEY
John P. Tarbox

Patented Aug. 25, 1931                                                1,820,064

UNITED STATES PATENT OFFICE

CHARLES R. GREEN, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

MEANS FOR ATTACHING UPHOLSTERY

Application filed January 9, 1926. Serial No. 80,364.

This invention relates to a means for attaching upholstery to a supporting member. More particularly, it relates to a means for attaching upholstery to the framework of the body of a motor vehicle, whether this framework be the body side sills, the door posts or the top rails.

The object of the invention is to provide an attaching means for upholstery which will permit the upholstery to be quickly and easily attached and yet allow that degree of adjustment which is necessary to obtain a perfect fit.

A further object is to provide an attaching means utilizing a screw and nut which may move with the upholstery to the position of final adjustment.

A still further object is to provide an arrangement such as permits the painting of the automobile body before the upholstery attaching means is secured in position.

The invention consists substantially in the construction, combination, location and relative arrangement of parts all as will be more fully set forth and shown in the accompanying drawings and finally pointed out in the appended claims.

In the drawings—

The same part is designated by the same reference numeral wherever it occurs in the several views.

The securing of upholstery to the interior of an automobile has always been more or less of a problem, this problem being especially evident where the body is constructed entirely of metal. In such a body it becomes impossible to use the ordinary wood screw for attaching the upholstery with the result that resort must be made to some other means for fastening the upholstery in place. The expedient which has been used most generally has been to provide a number of holes spaced at intervals throughout the framework of the body, these holes being adapted to receive bolts, rivets or other such securing means. Such an expedient, however, proved unsatisfactory for the reason that true registry and alignment must be maintained between the bolts secured to the upholstery and the holes provided therefor in the framework of the body in order that the upholstery may fit properly in place. This, however, was often impossible and as a result the upholstery did not have a smooth exterior surface, if it could be applied at all.

This invention contemplates a still further advantage in that it makes possible the painting of the body before the upholstery securing elements are put in place. In other words, it now becomes possible to paint the body in its entirety after which the upholstery may be secured in place. This was not possible with the methods used heretofore for the reason that one or more of the securing elements would be gummed up during the paint application and so cause considerable trouble in the application of the upholstery.

Figure 1:
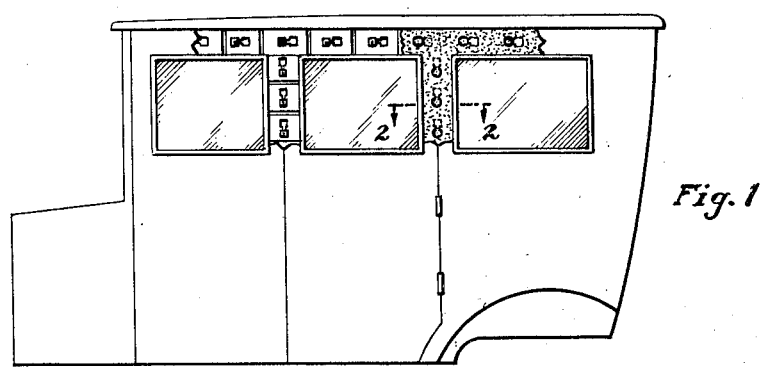
Figure 1 is a side elevation of an automobile body having a part thereof broken away to show the attaching means for holding the upholstery thereon.
Figure 2:
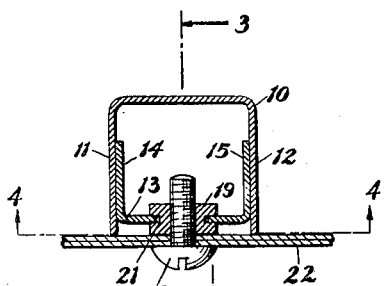
Fig. 2 is a cross section taken on the line 2—2 of Fig. 1.
Figure 4:
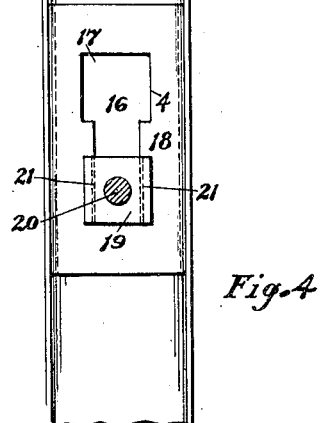
Fig. 4 is a cross section taken on the line 4—4 of Fig. 2.

Referring now specifically to the drawings, 10 is a door post of an automobile body, this door post in this instance being of substantially inwardly presenting channel formation and having the walls 11 and 12. Extending across the mouth of this channel door post is the body portion 13 of the upholstery attaching means which, as is shown most clearly in Fig. 2, comprises a sheet metal channel having the arms 14 and 15 secured, preferably by welding, to the walls 11 and 12, respectively, of the door post. A plurality of spaced attaching means exactly similar to the one just described are provided in the longitudinally extending body sills, the vertically extending door post and the top side rails of the body framework.

The body portion 13 of the attaching means is perforated as at 16, this perforation being formed so as to provide a slot with an enlarged portion 17 and a reduced portion 18. Adapted to be received freely within the enlarged portion 17 of the slot 16 is an interiorly screw threaded nut 19 having a screw or bolt 20 threaded therethrough.

This nut 19 is of a width substantially greater than the width of the reduced portion 18 of the slot 16. However, in order that the nut may be seated within this portion 18 of the slot, the nut is provided with oppositely disposed kerfs 21 adapted to freely receive the inner side edges of the slot portion 18. There is thus provided an arrangement which permits the nut and the screw, which is threaded therein, to be passed from the enlarged portion 17 into the reduced portion 18 of the slot 16. Because of the relative size of the nut and the slot 18, the nut is held against rotation, the kerfs 21 being of a depth great enough to permit a limited lateral movement with respect to the body portion of the attaching means. There is permitted, however, a considerable longitudinal movement of the nut with respect to the body portion of the attaching means thus compensating for any variation in spacing of the upholstery securing elements.

Figure 3:
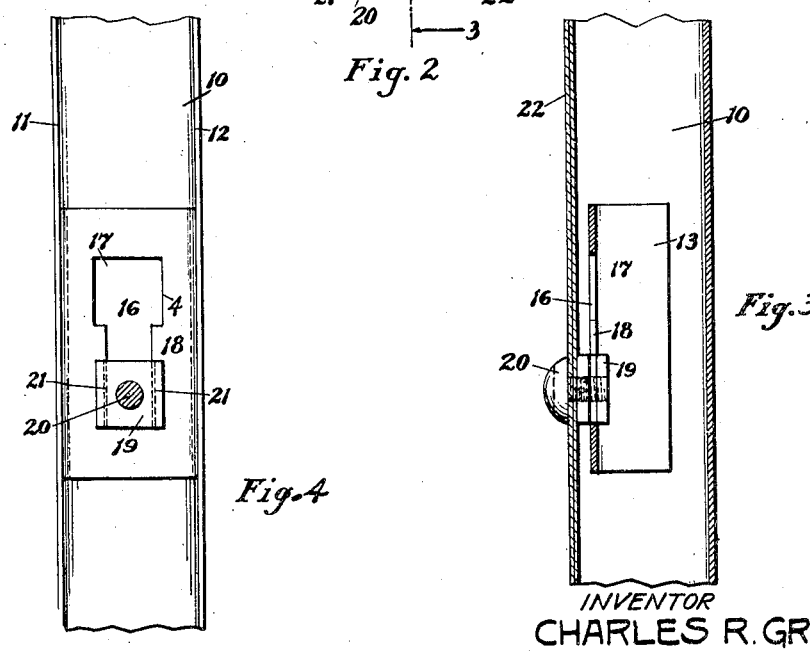
Fig. 3 is a cross section taken on the line 3—3 of Fig. 2.

Referring to Fig. 3, the upholstery 22 is held between the header of the screw 20 and the nut 19. For the purpose of positioning the screw and the nut in the upholstery a series of holes may be provided therein and the screw passed therethrough and the nuts threaded on the screw. It will thus be seen that the upholstery carries all of the securing elements. In order to fasten the upholstery in place it is positioned in such manner against the body framework that the nuts 19 are passed into the enlarged portions of the slot 16, the kerfs 21 in the nut being in alignment with the side walls of the reduced portions 18 of the slots. When so moved, the side edges 9 of the slot 18 are received within the kerfs 21 of the nuts to hold the latter from rotating, as well as from limited lateral movement with respect to the body portion 13 of the upholstery attaching means. The screws 20 may then be turned so as to draw the nut 19 and the heads of the screws tightly against the opposite sides of the upholstery whereby to clamp the upholstery therebetween in the desired position.

A particular advantage of this construction resides in the fact that if the holes which are punched in the upholstery for the reception of the screws 19 happen to be unevenly spaced, the longitudinal movement of the nuts coupled with the limited lateral movement thereof in the narrow slots 18 will compensate for this irregularity and permit the upholstery to be fitted without buckling or wrinkling as would be the case if the points of adjustment were fixed.

A further advantage, and of scarcely less importance, is that which is derived from the fact that the automobile body structure may be painted in its entirety before the nuts are put in place for the reason that the nuts are inserted only when the upholstery is ready to be secured in position.

The attaching means greatly facilitates the fastening of the upholstery in position and permits an even and perfect fit, which is a pronounced advantage in the manufacturing operation to which it is applied and also provides a strong and durable fastening for the upholstery.

Having described my invention, what I claim as new and useful is:—

1. An attaching means for upholstery and the like comprising a body portion having a slot therein formed with enlarged and restricted portions, means adapted to be attached to said upholstery having a part thereof provided with an enlargement adapted to be freely passed into said enlarged portion of said slot, said enlargement having slots therein adapted to freely receive a portion of the walls of said restricted portion whereby said part is adapted to be passed from said enlarged portion into said restricted portion and be held thereby from dislodgement from said body portion.

2. An attaching means for upholstery and the like comprising a body portion having a slot therein formed with enlarged and restricted portions, a screw and nut adapted to hold said upholstery therebetween, said nut being adapted to pass freely into said enlarged portion and thence into said restricted portion of said slot and being provided with means to receive therein the side edges of the walls of said restricted portion in such a manner as to prevent transverse and rotative motion thereof with respect to said body portion.

3. An attaching means for upholstery and the like comprising a body portion having a slot therein formed with enlarged and restricted portions having parallel edges, a screw and nut adapted to hold said upholstery therebetween, said nut being so constructed as to be freely passed into said enlarged portion and formed with kerfs adapted to receive therein a portion of the parallel edges of said restricted portion in such a manner as to be freely passed thereinto from said enlarged portion and to prevent transverse and rotative motion thereof with respect to said body portion.

4. An attaching means for upholstery and the like comprising a body portion having a slot therein formed with enlarged and restricted portions providing opposed edges, a screw and nut adapted to hold said upholstery therebetween, said nut being so constructed as to be freely passed into said enlarged portion and the opposed sides thereof being grooved to receive the edges of the restricted portion of said slot, whereby transverse and rotational movement of said nut relative to said body portion will be prevented.

5. In an automobile body, a pressed metal framework having provided therein a slot having opposed edges, screw and nut elements adapted to hold the upholstery therebetween, one of said elements being provided with opposed marginal grooves adapted to receive said edges, whereby extended rotative movement of the element with respect to said body portion will be prevented.

In testimony whereof he hereunto affixes his signature.

CHARLES R. GREEN.